(12) United States Patent
Coordes et al.

(10) Patent No.: US 10,626,573 B2
(45) Date of Patent: Apr. 21, 2020

(54) WIND TURBINE AND WIND TURBINE FOUNDATION

(71) Applicant: Wobben Properties GmbH, Aurich (DE)

(72) Inventors: Thomas Coordes, Ihlow (DE); Frank Pollman, Aurich (DE); Alexander Gröss, Wittmund (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 15/901,754

(22) Filed: Feb. 21, 2018

(65) Prior Publication Data

US 2018/0179722 A1 Jun. 28, 2018

Related U.S. Application Data

(63) Continuation of application No. 14/900,015, filed as application No. PCT/EP2014/062963 on Jun. 19, 2014, now abandoned.

(30) Foreign Application Priority Data

Jun. 21, 2013 (DE) ........................ 10 2013 211 750

(51) Int. Cl.
*E02D 27/42* (2006.01)
*E04H 12/16* (2006.01)
*F03D 13/20* (2016.01)

(52) U.S. Cl.
CPC ........... *E02D 27/425* (2013.01); *E04H 12/16* (2013.01); *F03D 13/20* (2016.05); *F03D 13/22* (2016.05); *Y02E 10/728* (2013.01)

(58) Field of Classification Search
CPC ........ F03D 13/20; F03D 13/22; F03D 11/045; E02D 27/425; E04H 12/16
USPC ...... 52/40, 169.13, 650.01, 294, 296, 169.9, 52/292, 297, 298
See application file for complete search history.

(56) References Cited

U.S. PATENT DOCUMENTS

| 6,470,645 | B1 | 10/2002 | Maliszewski et al. |
| 7,219,873 | B2 | 5/2007 | Harwood |
| 7,752,825 | B2 | 7/2010 | Wobben |
| 8,272,173 | B2 | 9/2012 | Jakubowski |
| 8,443,557 | B2 | 5/2013 | Gevers et al. |
| 8,484,905 | B2 | 7/2013 | Skjaerbaek et al. |
| 8,567,131 | B2 | 10/2013 | Ollgaard |

(Continued)

FOREIGN PATENT DOCUMENTS

| DE | 102010023263 A1 | 12/2011 |
| DE | 10230273 B3 | 2/2014 |

(Continued)

*Primary Examiner* — Theodore V Adamos
(74) *Attorney, Agent, or Firm* — Seed Intellectual Property Law Group LLP

(57) ABSTRACT

A wind energy plant is provided with a foundation base and a tower which is placed on the foundation base. The foundation base has a foundation plate below ground level and a foundation plinth on the foundation plate above ground level. On the foundation plinth a tension cord connector is provided with a plurality of bores for receiving tension cords. The tension cords are tensioned on an underneath side of the connector by means of a tension cord head. The foundation plate and the foundation plinth are cast in one piece from site-mixed concrete.

13 Claims, 5 Drawing Sheets

(56) References Cited

U.S. PATENT DOCUMENTS

| | | | |
|---|---|---|---|
| 2007/0251187 A1* | 11/2007 | Schiffer | E02D 27/42 |
| | | | 52/741.14 |
| 2009/0282774 A1* | 11/2009 | Jensen | E02D 27/42 |
| | | | 52/698 |
| 2010/0024311 A1* | 2/2010 | Wambeke | E04H 12/085 |
| | | | 52/40 |
| 2010/0253086 A1 | 10/2010 | Song et al. | |
| 2010/0325986 A1* | 12/2010 | Garc A Maestre | E04H 12/085 |
| | | | 52/223.3 |
| 2011/0061321 A1 | 3/2011 | Phuly | |
| 2011/0113708 A1* | 5/2011 | Skjaerbaek | E04C 5/125 |
| | | | 52/223.1 |
| 2011/0131899 A1* | 6/2011 | Voss | E02D 27/42 |
| | | | 52/173.1 |
| 2011/0138704 A1 | 6/2011 | Bagepalli et al. | |
| 2012/0012727 A1 | 1/2012 | Häger | |
| 2012/0014775 A1 | 1/2012 | Numajiri et al. | |
| 2012/0205133 A1 | 8/2012 | Jensen et al. | |
| 2012/0266552 A1* | 10/2012 | Huynh Tong | E04H 12/16 |
| | | | 52/223.4 |
| 2013/0001954 A1 | 1/2013 | García Maestre et al. | |
| 2013/0199117 A1* | 8/2013 | Tuominen | E02D 27/42 |
| | | | 52/297 |
| 2014/0250806 A1 | 9/2014 | Schibsbye | |
| 2014/0298737 A1* | 10/2014 | Fernandez Gomez | E04H 12/12 |
| | | | 52/220.1 |
| 2015/0143765 A1 | 5/2015 | Carril González et al. | |
| 2016/0312431 A1* | 10/2016 | Coordes | F03D 13/20 |

FOREIGN PATENT DOCUMENTS

| | | | |
|---|---|---|---|
| EA | 201170398 A1 | 8/2011 | |
| EP | 1262614 A2 | 12/2002 | |
| EP | 2302146 A2 | 3/2011 | |
| EP | 2339094 A1 | 6/2011 | |
| JP | 2007-535634 A | 12/2007 | |
| JP | 2013-7251 A | 1/2013 | |
| JP | 2015-501891 A | 1/2015 | |
| KR | 1020120002469 A | 1/2012 | |
| RU | 40769 U1 | 9/2004 | |
| SU | 883297 | 11/1981 | |
| WO | 2005/095792 A1 | 10/2005 | |
| WO | 2012163906 A1 | 12/2012 | |
| WO | WO-2012168467 A2 * | 12/2012 | E04H 12/12 |
| WO | 2013068403 A1 | 5/2013 | |

* cited by examiner

WIND TURBINE AND WIND TURBINE FOUNDATION

BACKGROUND

Technical Field

The present invention relates to a wind energy plant and to a wind energy plant foundation base.

Description of the Related Art

Before a tower of a wind energy plant is erected, a corresponding foundation base has to be provided in the ground. The foundation base is typically cast, for example, with concrete on site. After the concrete has hardened a first tower segment can be placed on the foundation base.

FIG. 2A shows a diagrammatic illustration of a foundation base of a wind energy plant according to the prior art. A foundation base 210 cast of concrete has an ingate 210c or a cast ring 210c which has a bore 210b for receiving a tensioning cable 230. The ingate 210c is thereby located underneath the ground. The wall of the tower segments 102 is provided with a plurality of bores 102a through which the relevant tensioning cables or tension cords 230 can be guided. These tension cords 230 are used to tension the segments of the tower of the wind energy plant. At the lower end 210d of the ingate 210c there is at least one tension cord head 240. A basement or a further space 210a can be provided underneath the ingate 210c where the tension cords 230 can be pretensioned by means of the tension cord head 240. With the embodiment of FIG. 2A an internal tensioning is shown, i.e. the tension cords run inside the tower wall.

FIG. 2B shows a diagrammatic illustration of a foundation base of a wind energy plant according to the prior art. The foundation base 210 is cast of concrete and has an ingate 210c with at least one bore 210b for the tensioning cable or the tension cord 230. As opposed to FIG. 2A the tension cord 230 is not guided inside the formwork of the tower, but inside the tower and outside of the tower wall so that this is an internally tensioned or externally tensioned tower respectively. As shown in FIG. 2A the ingate has an underneath side 210a where a tension cord head 240 is provided for tensioning the tension cord or tensioning cable. Earth, gravel 10 or the like can be provided at least in part above the concrete foundation base 210.

In order to be able to tension the tension cords 230 by means of the tension cord head a foundation basement 210a, i.e., a space below ground level, has to be provided.

BRIEF SUMMARY

One or more embodiments of the present invention provide a wind energy plant with an improved foundation base and an improved wind energy foundation base respectively.

A wind energy plant is provided with a foundation base and a tower which is placed on the foundation base. The foundation base has a foundation plate and a foundation plinth on the foundation plate. A tension cord connector is provided on the foundation plinth and has a plurality of bores for receiving tension cords. The tension cords are tensioned on an underneath side of the connector by means of a tension cord head. The foundation plate and the foundation plinth are cast from concrete, and the foundation plinth can project above the ground, whilst the foundation plate is located underneath the ground.

The distance between the upper side of the concrete plate and an underneath side of the tension cord connector is large enough so that the workers have enough space to tension the tension cords.

According to a further aspect of the present invention the foundation plate and the foundation plinth are cast in one piece from site-mixed concrete.

The invention likewise relates to a wind energy plant foundation base having a foundation plate and a foundation plinth on the foundation plate. An ingate is provided on the foundation plinth with a plurality of bores for receiving tensioning cables or tension cords. The tensioning cables or tension cords are tensioned on an underneath side of the ingate by means of a tension cord head. The foundation plate and the foundation plinth are cast from concrete and can project above the ground.

One or more embodiments of the invention relates to the idea of providing a concrete foundation base with a concrete plinth and providing the ingate for the tension cords on the plinth. The plinth is hereby disposed above the foundation base.

In order to erect a wind energy plant or a tower of a wind energy plant, first the foundation base is provided and then tower segments are placed on the foundation base. The tower segments and the foundation base are then connected by tension cords to a static system. The tower segments as well as the foundation base can be manufactured and supplied separately. Through the foundation base it is possible to dispense with a foundation basement as well as with a foundation base cover. The foundation bases can be constructed flatter so that building costs, excavation and construction time can be considerably reduced.

One or more embodiments invention further relates to the idea of casting a lower tower segment directly together with the foundation base from concrete or site-mixed concrete so that the foundation base comprises a foundation plate and on the plate a plinth or a segment which is adapted to a foundation base placed thereon and is arranged above the foundation base or above the ground. An ingate is provided on the plinth or the segment with a plurality of bores for receiving a tensioning cable or a tension cord. The foundation base can be used both for the internal tensioning or for the external tensioning (inside the tower).

According to one embodiment of the invention the plinth or the segment is cast in the form of a lower tower segment of the tower together with the foundation base. The plinth projects optionally above the ground or ground level. This is advantageous because then no foundation basement need be provided and there is sufficient space to tension the tension cords by means of a tension cord head.

Further configurations of the invention form the subject of the dependent claims.

BRIEF DESCRIPTION OF THE SEVERAL VIEWS OF THE DRAWINGS

Advantages and embodiments of the invention will now be explained in further detail below with reference to the drawings.

DETAILED DESCRIPTION

Figure 1:
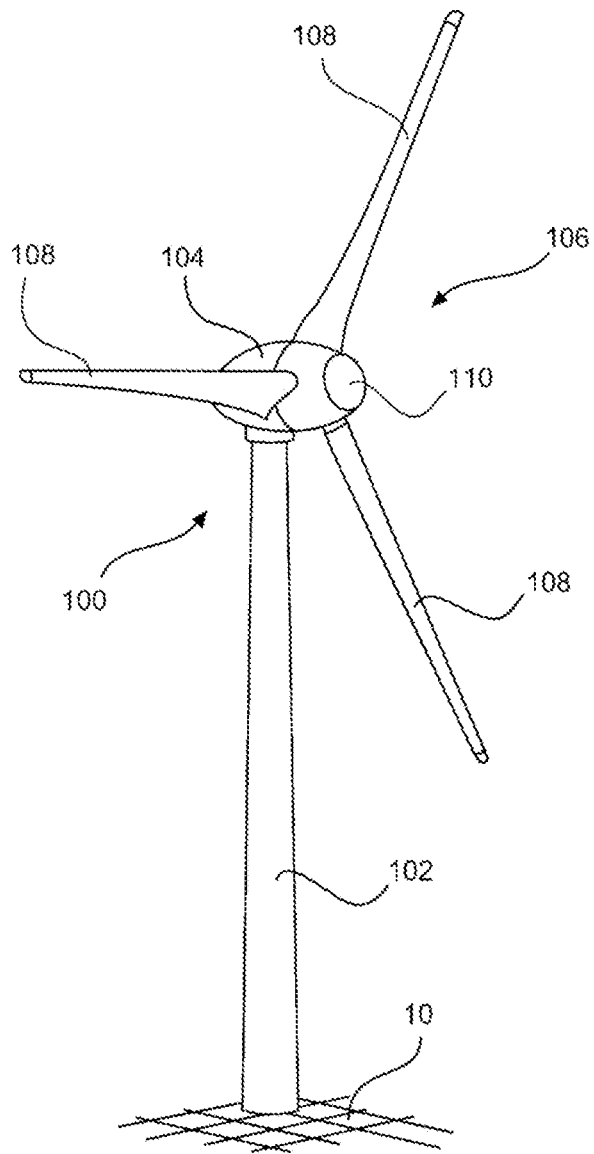
FIG. 1 shows a diagrammatic illustration of a wind energy plant according to the invention.
Figure 2A:
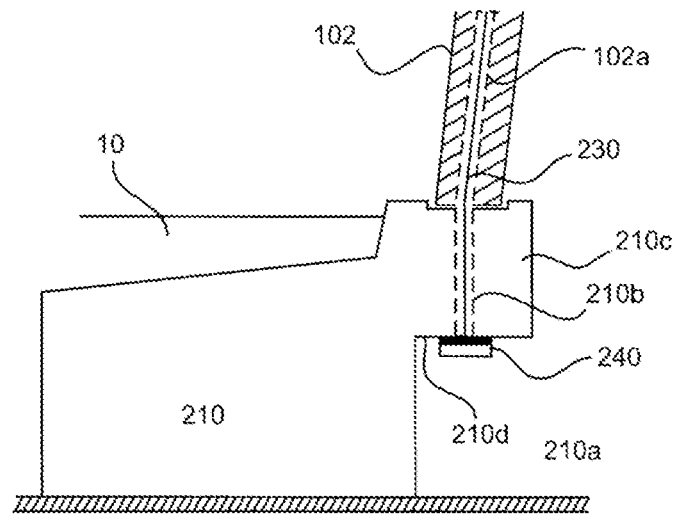
FIGS. 2A and 2B each show a diagrammatic sectional view of a foundation base of a wind energy plant according to the prior art.
Figure 2B:
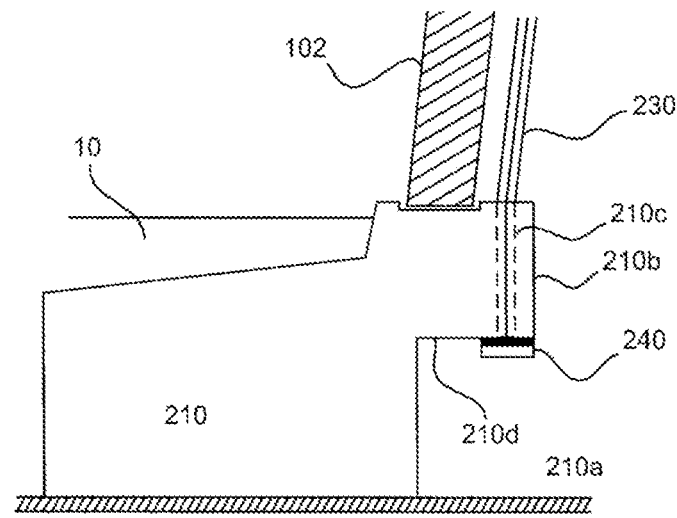

FIG. 1 shows a diagrammatic illustration of a wind energy plant according to the invention. The wind energy plant 100 comprises a tower 102 and a nacelle 104. A rotor 106 on the nacelle 104 is provided with three rotor blades 108 and a spinner 110. During operation the rotor 106 is set in a rotational movement through the wind and thus also turns the rotor or armature of the generator in the nacelle 104. The pitch angle of the rotor blades 108 can be changed by pitch motors at the rotor blade roots of each respective rotor blade 108.

Figure 3:
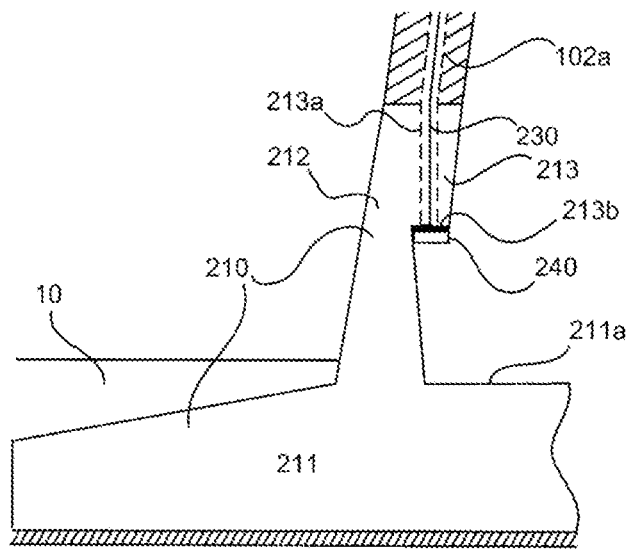
FIG. 3 shows a diagrammatic sectional view of a foundation base of a wind energy plant according to a first embodiment.

FIG. 3 shows a diagrammatic sectional view of a foundation base of a wind energy plant according to a first embodiment. The foundation base 210 of the wind energy plant has a foundation plate 211 with a foundation plinth or foundation segment 212. The foundation plinth or foundation segment 212 is circular in design and serves for supporting a first tower segment 102a thereon. The foundation plinth or the foundation segment 212 projects above the ground or ground level 10 whilst the foundation plate 211 is provided below ground level.

A tension cord connector is provided on the foundation plinth or foundation segment 212 optionally in the form of an ingate 213 with a plurality of bores 213a each for receiving a tension cord or tensioning cable 230. A first tower segment 102a of a tower of the wind energy plant can be placed on the foundation plinth or foundation segment 212.

The first embodiment shows an internal tensioning of the tower segments of the tower of the wind energy plant since the tensioning cables or tension cords 230 run inside the tower wall or the tower segments.

Figure 4:
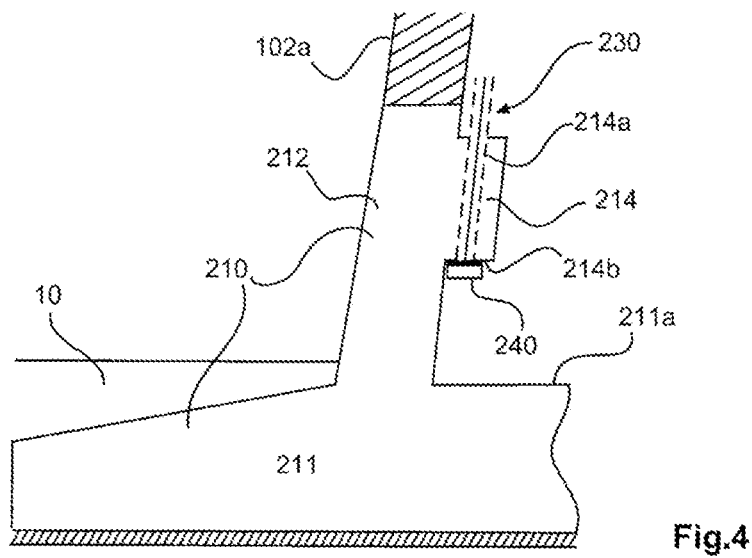
FIG. 4 shows a diagrammatic sectional view of a foundation base of a wind energy plant according to a second embodiment.

FIG. 4 shows a diagrammatic illustration of a foundation base of a wind energy plant according to a second embodiment. The foundation 210 comprises a foundation plate 211 (below ground level) and a foundation plinth or a foundation segment 212 (above ground level). On the foundation plinth or foundation segment 212 a tension cord connector is provided optionally in the form of an ingate 214 with a plurality of bores 214a which are used for receiving the tension cords or tensioning cables. A tension cord head 240 for tensioning the tension cords 230 is provided at a lower end 214b of the ingate 214.

According to the second embodiment an external tensioning is shown since here the tensioning cables are provided not within the tower wall, but outside of the tower wall but inside the tower.

The wind energy plant foundation bases according to the first and second embodiments differ essentially through the configuration of the ingate 213, 214 which are each provided to allow tensioning of the tension cords or tensioning cables. The ingate or tension cord connector 213, 214 is arranged optionally above the ground 10 or ground level. A foundation basement can thus be avoided. The ingate 213, 214 according to the first or second embodiment can be provided as a ring which can extend along the entire periphery of the tower.

Optionally the distance between an upper end 211a of the foundation plate 211 and a lower end 213b, 214b of the ingate 213, 214 can amount to at least a meter. The height of the ingate 213, 214 can optionally amount to at least a meter.

The tension cord connector can optionally be designed as an ingate 214 and can be cast together with the foundation plate 211 and the plinth 212.

According to a third to sixth embodiment of the invention a foundation plinth or foundation segment is not cast of concrete together with the remaining foundation base, but is designed as a steel tower foot section.

Figure 5:
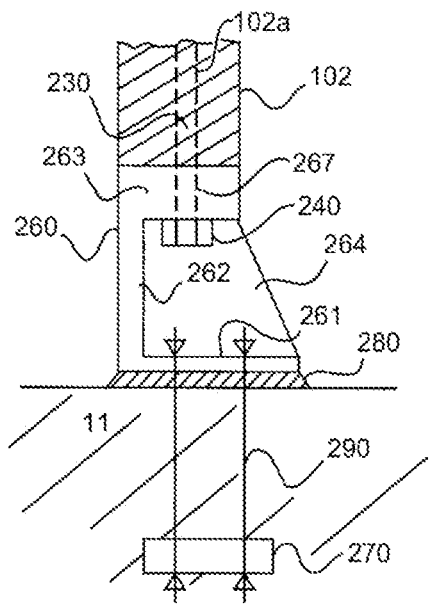
FIG. 5 shows a diagrammatic sectional view of a foundation base of a wind energy plant according to a third embodiment.

FIG. 5 shows a diagrammatic sectional view of a wind energy plant foundation base according to a third embodiment. Several segment anchors 270 and threaded rods 290 are provided in a concrete foundation base 11 and project beyond the foundation base 11. A joint 280 (e.g., a hard concrete joint) can be provided on the foundation base 11 on which a foundation segment 260, e.g., in the form of a peripheral steel adapter is provided. The steel adapter 260 has a lower end 261, an upper end 263 as well as a side or sleeve face 262. A plurality of bores 267 are provided in the upper end 263. The bores 267 serve to receive the tension cords or tensioning cables 230. The tower segments of the wind energy plant tower 102 have on the inside several bores through which the tension cords or tensioning cables 230 can be guided. The tension cords or tensioning cables can be tensioned by means of a tension cord head 240 which is provided on the underneath side of the upper end 263 of the steel adapter 260.

According to the third embodiment an internal tensioning of the tower of the wind energy plant is provided.

Figure 6:
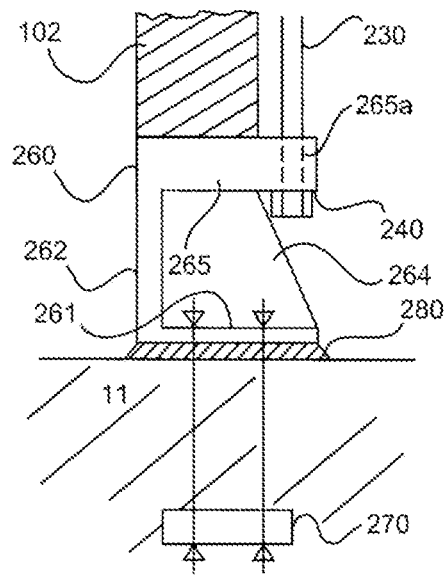
FIG. 6 shows a diagrammatic illustration of a foundation base of a wind energy plant according to a fourth embodiment.

FIG. 6 shows a diagrammatic sectional view of a foundation base of a wind energy plant according to a further embodiment. The foundation according to the fourth embodiment corresponds substantially to the foundation base according to the third embodiment wherein the upper end 265 is made longer. The upper end 265 has a plurality of bores 265a which are provided for receiving the tension cords or tensioning cables 230. A tension cord head 240 is provided underneath the upper end 265 for tensioning the tension cords or tensioning cables.

According to the fourth embodiment an external tensioning of the tower segments is thus provided wherein the tension cords or tensioning cables 230 are located inside the tower.

According to the third and fourth embodiments the steel adapter 260 can be filled with a Pagel mass 264 which is advantageous as regards strengthening the adapter as soon as the Pagel mass is hardened.

According to the third and fourth embodiments the segment anchor 270 can be configured as an anchor ring.

According to a fifth and sixth embodiments a foundation section is provided which is anchored in part in the foundation base. An upper end of the foundation section has a plurality of bores for receiving the tension cods or tensioning cables which are then tensioned by means of a tension cord head.

Figure 7:
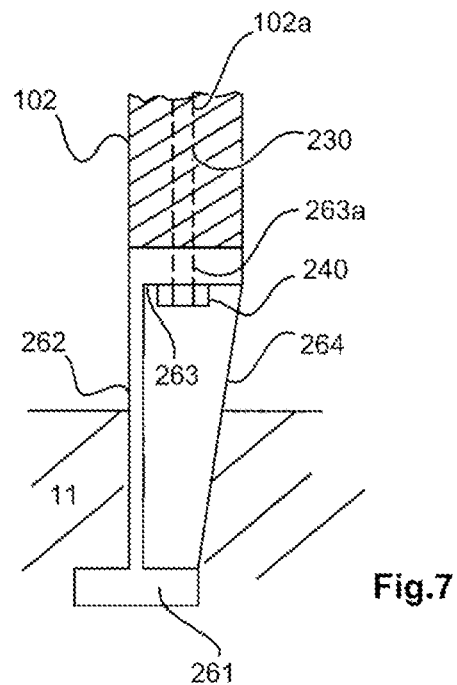
FIG. 7 shows a diagrammatic sectional view of a foundation base of a wind energy plant according to a fifth embodiment.

FIG. 7 shows a diagrammatic sectional view of a foundation base of a wind energy plant according to a fifth embodiment. A foundation section 260 has a lower end 261 and an upper end 263 as well as a side or sleeve face 262. The lower end 261 of the foundation section is placed at least in part in a concrete foundation base 11. The upper end 263 has a plurality of bores 263a. A lower tower segment of a tower 102 of the wind energy plant can be placed on the upper end 263. A plurality of bores 102a are provided in the wall of the tower segment. Tensioning cables can be inserted through the bores 102a and the bores 263a and can then be tensioned by means of a tension cable head 240.

According to the fifth embodiment internal tensioning is provided.

The foundation section 260 can have a reinforcement plate 264. The foundation section 260 can be made from metal.

Figure 8:
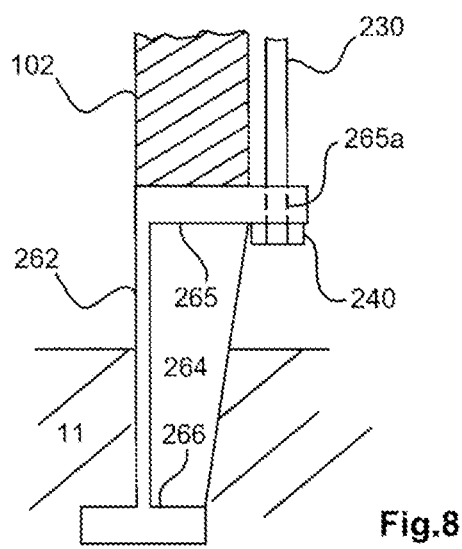
FIG. 8 shows a diagrammatic sectional view of a foundation base of a wind energy plant according to a sixth embodiment.

FIG. 8 shows a diagrammatic sectional view of a foundation base of a wind energy plant according to a sixth embodiment. The foundation base according to the sixth embodiment corresponds to the foundation base according to the fifth embodiment wherein the upper end of the tower section is made longer so that a section of the upper end 265 projects into the tower and has there a plurality of bores 265a through which tension cords or tensioning cables 230 can be guided so that these can then be tensioned by a tension cord head 240.

The foundation section 260 can have a reinforcement plate 264.

According to the sixth embodiment an external tensioning is thus provided wherein the tensioning cables run in the interior of the tower.

The invention claimed is:

1. A wind energy plant, comprising:
   a foundation base comprising:
      a concrete foundation base;
      a plurality of segment anchors embedded in the concrete foundation base;
      a plurality of threaded rods provided in the concrete foundation base, the plurality of threaded rods extending from the plurality of segment anchors with ends of the plurality of threaded rods projecting from the concrete foundation base; and
      a foundation segment made of steel and having a lower end, an upper end, and a side or sleeve face, the lower end including a plurality of bores that receive the plurality of threaded rods, respectively, the upper end including a plurality of bores, wherein both the lower and upper ends extend at opposing ends of the side or sleeve face toward a central portion of the tower and do not extend outwardly;
   a tower comprising a plurality of tower segments made of concrete, the plurality of tower segments being stacked vertically on the foundation segment; and
   a plurality of tensioning cables extending through the plurality of bores of the upper end of the foundation segment, wherein the plurality of tensioning cables are coupled to the foundation segment at the upper end of the foundation segment, wherein the plurality of tensioning cables tension the plurality of tower segments of the tower,
   wherein the lower end and the plurality of bores of the foundation segment are located inward of the side or sleeve face such that all of the plurality of rods are located inside the tower.

2. The wind energy plant according to claim 1 further comprising a plurality of tension cord heads at an under side of the upper end of the foundation segment.

3. The wind energy plant according to claim 2 wherein the plurality of tension cord heads couple the plurality of tensioning cables to the upper end of the foundation segment and are configured to control the tensioning of the plurality of tensioning cables, respectively.

4. The wind energy plant according to claim 1 wherein the foundation segment is filled with a Pagel mass.

5. The wind energy plant according to claim 1 further comprising a joint between the concrete foundation base and the foundation segment.

6. The wind energy plant according to claim 1 wherein the plurality of segment anchors are arranged in the concrete foundation base as an anchor ring.

7. The wind energy plant according to claim 1 wherein the lower end of the foundation segment is fastened with the ends of the plurality of threaded rods projecting beyond the foundation base.

8. The wind energy plant according to claim 1 wherein the plurality of tower segments include a plurality of bores, wherein the tensioning cables extend through the plurality of bores in the tower segments of the tower.

9. The wind energy plant according to claim 1 wherein the plurality of tensioning cables extend along an inner surface of the tower.

10. The wind energy plant according to claim 9 wherein the upper end of the foundation segment has a thickness that is greater than a thickness of the tower, such that a portion of the upper end of the foundation segment extends beyond the inner surface of the tower.

11. The wind energy plant according to claim 10 wherein the plurality of bores of the upper end of the foundation segment are located inside of the tower.

12. The wind energy plant according to claim 1 wherein the plurality of tower segments includes a lower tower segment, wherein the lower tower segment is placed directly on the upper end of the foundation segment.

13. The wind energy plant according to claim 1 wherein the foundation segment is C-shaped.

* * * * *